United States Patent [19]

Rohs et al.

[11] Patent Number: 4,987,789
[45] Date of Patent: Jan. 29, 1991

[54] SWIVEL DISK FRICTION GEARING

[76] Inventors: Ulrich Rohs, Roonstrasse 11, D-5160 Duren; Dietmar Heidingsfeld, Bodelschwinghstrasse 36; Herbert Meuter, An der Weingass 24, both of D-5100 Aachen, all of Fed. Rep. of Germany

[21] Appl. No.: 293,635

[22] Filed: Jan. 5, 1989

[30] Foreign Application Priority Data

Jan. 7, 1988 [DE] Fed. Rep. of Germany ....... 3800170

[51] Int. Cl.$^5$ ............................................. F16H 15/08
[52] U.S. Cl. ...................................... 74/200; 74/190; 74/208; 74/212
[58] Field of Search ................. 74/690, 691, 675, 650, 74/755, 208, 212, 199, 200, 201, 796; 475/165, 166, 169, 183, 185, 190–192, 195–197, 214, 216, 347

[56] References Cited

U.S. PATENT DOCUMENTS

| | | | |
|---|---|---|---|
| 3,653,272 | 4/1972 | Scheiter | 74/200 X |
| 3,820,416 | 6/1974 | Kraus | 74/690 |
| 3,823,613 | 7/1974 | Abbott | 74/691 X |
| 4,484,487 | 11/1984 | Kraus | 74/200 |
| 4,576,055 | 3/1986 | Kraus | 74/200 |
| 4,587,866 | 5/1986 | Kraus | 475/216 X |

FOREIGN PATENT DOCUMENTS 207184 1/1987 European Pat. Off. .

Primary Examiner—Leslie A. Braun
Assistant Examiner—Benjamin Levi
Attorney, Agent, or Firm—Collard, Roe & Galgano

[57] ABSTRACT

A swivel disk friction gear system has a driving part and a driven part, each having a concave outer surface. An axially adjustable set ring is arranged between these parts. The gear system also has swivel disks with convex outer surfaces which are pivotably mounted in the set ring and swing freely with respect thereto and are frictionally engaged with the concave surface of the driving and driven parts. A drive shaft connected with the driving part has a piston rigidly connected thereto. The piston is surrounded by a cylindrical bore defining a hollow space within the driving or driven part, which part is axially displaceable on the drive shaft. The hollow space acts as a compression space to accommodate movement of the piston plate, the compression space is connected with a pressure conduit for a pressure medium. The drive train has a pumping system arranged on the drive shaft for actuating the piston and producing an adequate contact pressure for adjusting one of the driving or driven part to produce a frictional lock therebetween via the pivotal disk. A pressure control device is associated with the pump.

6 Claims, 3 Drawing Sheets

SWIVEL DISK FRICTION GEARING

1. Field of the Invention

The invention relates to a swivel disk friction gear system consisting of a driving part and a driven part, each having a concave outer profile. An axially adjustable set ring is arranged between the driving and driven parts and has swivel disks with a convex profile pivotably mounted thereon. Such disks are frictionally engaged with the driving and driven parts. A drive shaft connected with the driving part has a piston plate rigidly joined therewith. The piston plate is surrounded by a cylindrical bore defining a hollow space within one of the driving or driven parts, which part is axially displaceable on the drive shaft. The hollow space forms a compression space which is connected to a pressure conduit for a pressure medium.

2. Description of the Prior Art

A swivel plate friction gear system of this type is known from European published patent disclosure No. EP-OS 02 07 184. In order to achieve a largely slip-free motion transmission, it is necessary to force the swivel disks against the driving and driven parts. Preferably, this is done by hydraulic or pneumatic means. If such pressure is applied hydraulically, a very high pressure of the pressure medium, for example, of up to 500 bar, is necessary to force the swivel disk against the driving or driven part.

SUMMARY OF THE INVENTION

It is an object of the present invention to provide a system to transmit the required pressure from a pressure medium to the parts to be forced together with a minimum of pressure loss.

It is another object of the invention to provide a means to control the pressure exerted between the driving and driven parts during lockup.

It is yet another object of the present invention to provide a friction gear system having a swivel disk which is simple in design but which allows for the accurate control of force transmission within the gear system.

According to the present invention, this problem may be overcome by a swivel disk friction gear system having a drive shaft and a driven shaft. The driving part mounted on the drive shaft has a concave outer surface. The system includes a coaxial driven part having a concave outer surface. It is rotatably mounted on the drive shaft and rigidly coupled to the driven shaft. A set ring is mounted between the driving and driven parts and is moveable in the axial direction. A swivel disc having a convex outer surface is pivotably mounted on the set ring for free pivoting with respect thereto and frictionally engages the concave surface of the driving parts. A cylindrical bore is located in one of the driving or the driven parts. The one part having the bore is axially displaceable on the drive shaft toward the other of the driving or driven parts. A piston is fixed to the drive shaft and is mounted within the cylindrical bore in a manner defining a closed space therebetween. The piston moves relative to the bore upon the axial displacement of the part having the bore. A conduit is provided for introducing pressurized fluid medium into the space within the cylindrical bore between the piston and the base of the bore. A pump is operatively coupled to the drive shaft and is actuated by the rotation thereof for pressurizing the pressurized fluid medium. The pump produces sufficient pressure to axially move the one part with respect to the drive shaft to produce, via the swivel disks, a frictional engagement between the driving and driven parts. A control system is provided for controlling the pressure of the pressurized fluid medium to vary the force of the frictional engagement.

The required pressure is first generated by a pump operatively coupled to the drive shaft, which pump may be arranged within the shaft. The required pump pressure is controlled by a control device also arranged on the drive shaft. This can be accomplished in several different ways. One embodiment of the invention utilizes a radial piston pump wherein the pressure medium is conveyed as long as a relative number of revolutions is present between the input shaft and the drive shaft. When the return conduit of the pressure medium is blocked, a pressure proportional to the torque to be transmitted builds up on the pressure side. After the pressure of the pressure medium has reached a corresponding value, the input and the driving shafts rotate as a unit.

As long as the pistons guided on the control cam are capable of going through a stroke or reciprocate, the input shaft is coupled with the drive shaft, and the pistons generate a pressure that is proportional to the torque to be transmitted. Such a coupling effect is stopped only when the pistons, on further axial displacement of the coupling part, engage and run on the cylindrical portion of the cam control, having a diameter such that the pistons no longer can reciprocate.

Another simplified embodiment of the invention having only one pump piston is disclosed wherein the piston of the pump is no longer in the direct flow of force and generates a pressure of the pressure medium corresponding to a stroke predetermined by a control cam. This pressure is controllable as required by changing the stroke of the pump. In order to permit a downward correction of the pressure, i.e., a pressure reduction, provision is made for a relief conduit leading away from the pressure conduit downstream of the second return valve. This relief conduit may be cut off by a controlled relief valve. Other advantageous variations are also disclosed which result in the pressure of the pressure medium being generated only in the rotating part, resulting in lower pressure losses.

These and other objects and advantages of the present invention will become apparent from the following description of the accompanying drawings, which disclose several embodiments of the invention. It is to be understood that the drawings are to be used for purposes of illustration only, and not as a definition of the invention.

BRIEF DESCRIPTION OF THE DRAWINGS

Further advantages and details can be gleaned from the drawings wherein similar reference numerals denote similar elements throughout the several views.

DESCRIPTION OF THE PREFERRED EMBODIMENTS

Figure 1:
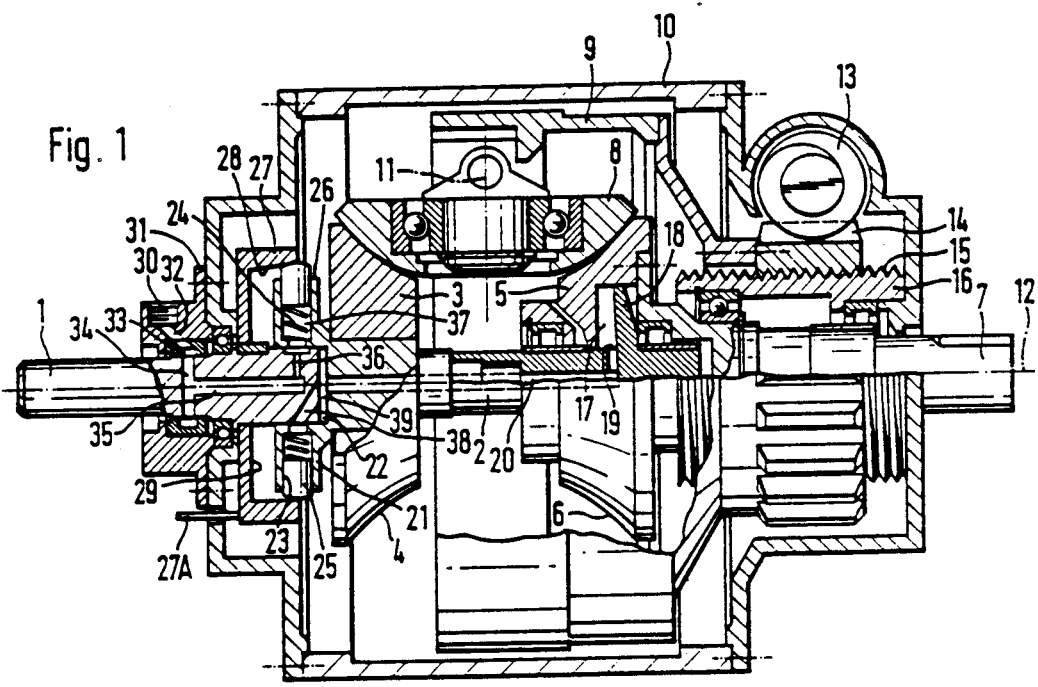
FIG. 1 is a side elevation view, partially in cross-section, of the friction gear system of the present invention with two controlled pump pistons and a driven part acted upon by a pressurized medium.

Referring to FIG. 1, there is shown a single-stage swivel disk friction gear system with an input shaft 1, a drive shaft 2 aligned with shaft 1 and having a driving part 3 having a conical outer surface 4 with a concave shape. A driven part 5, also with a conical outer surface 6 having a concave shape, is rotatably supported on drive shaft 2. Part 5 is rotatably mounted an axially displaceable shaft 2 and is rigidly joined to a driven shaft 7, the latter being rotatably supported in the housing 10 of the gear system.

Driving part 3 and driven part 5 are interconnected by frictional engagement with the swivel disks 8, such swivel disks in turn being pivotably mounted in a set ring 9 about a pivot pin therein. Set ring 9 is axially movable in housing 10 of the gearing. The transmission ratio transmitted to the driven shaft 7 varies depending on the inclination of the swivel disk axles 11 relative to the rotary axle 12 of driving and driven parts 3 and 5, respectively. Set ring 9 is axially adjusted by way of a control worm 13, which is engaged by a worm gear 14, the latter being rigidly joined with set ring 9. Worm gear 14 is guided on a thread 15 of the short cylinder 16 of the housing.

In addition, FIG. 1 shows that driven part 5 is in the form of a hollow body having a cylindrical hollow space 17 in its interior. A piston 18, which is rigidly joined with the free end of drive shaft 2, is arranged in and surrounded by cylindrical hollow space 17, with a compression space formed therebetween. Driven part 5, in this embodiment, is axially movably on shaft 2. A pressure conduit 20 for a pressure medium feeds into hollow space 17 at a point 19 upstream of piston plate 18.

On the drive side, drive shaft 2 has a flange-like pump casing 21, the latter being rigidly connected with the drive shaft and having, on the drive side, a central blindbore 22 for coaxially receiving the end of input shaft 1 on the driven side. The end of input shaft 1 is capable of rotating in this bore. At least two radial cylindrical bores 23 are arranged in pump casing 21 for receiving pump pistons 25, which are outwardly supported on pressure springs 24 and are guided within bores 23. The heads or tops of pistons 25, which point radially outwardly, project beyond the outer surface 26 of pump casing 21.

A bell-like coupling part 27 surrounds pump pistons 25 and rotates with input shaft 1. Coupling part 27 is arranged on shaft 1 and is axially displaceable thereon by means of a positioning device 27A (not shown in detail). Near the bottom 29, the inner surface 28 of coupling part 27 has a control cam having a first cylindrical portion of a predetermined diameter which then increases or widens toward the open end, for example, in the form of an eccentric curve for controlling the heads of the radially movable pump pistons 25. These heads are spring biased against the curve of the cam. The coupling part 27 with its positioning device forms a control means for controlling the pressure delivered by the pump At the front end of the gear housing part 31 supporting input shaft 1, provision is made for an inlet 30 for a pressure medium, for example, a hydraulic fluid. Inlet 30 feeds into an inlet chamber 33 via a bore 32, which, via the radial bores 34 in input shaft 1, is connected with an axial feed conduit 35. Conduit 35 feeds into a radial suction conduit 36, which is connected with a compression space 37 accommodating pressure spring 24 of one of pump pistons 25.

A pressure duct 38 leading from compression space 37 to the space 39 between the ends of input shaft 1 and drive shaft 2 is arranged in within input shaft 1. Pressure duct 38 is displaced relative to the mouth of the suction conduit 36 by a rotary angle depending on the number of pump pistons and/or the form or shape of the control cam, for example, by 180 degrees, as shown.

During the operation of the gear system, the pressure medium is fed, prior to being pressurized, into revolving input shaft 1 and passes into suction conduit 36 and, by the controlled stroke of pump pistons 25, from there into space 39, and conveyed from there into pressure conduit 20 disposed in drive shaft 2. The pressure building up in hollow space 17 effects an axial thrust motion of piston plate 18, which is rigidly connected with drive shaft 2. Drive part 3, therefore, moves swivel disks 8 into contact with driven parts 5 with the contact pressure being proportional to the torque to be transmitted.

Additionally, hollow space 17 and piston plate 18 jointly form a hydrostatic bearing absorbing the supporting force by which the force transmission system of the gear system is closed. However, the countermovement of driven part 5 relative to piston plate 18 results in gaps causing leakage and pressure losses which have to be constantly compensated for by the pump.

At the same time, a coupling effect is obtained between input and drive shafts 1 and 2, respectively, via the pressure medium present in the space 39. This coupling effect is ended only when coupling part 27 is displaced axially relative to pump pistons 25 until they engage the cylindrical part of the inner surface 28 and thus can no longer reciprocate, i.e., the pistons can no longer perform the required stroke. This axial displacement is accomplished by means of positioning device 27A.

Figure 2:
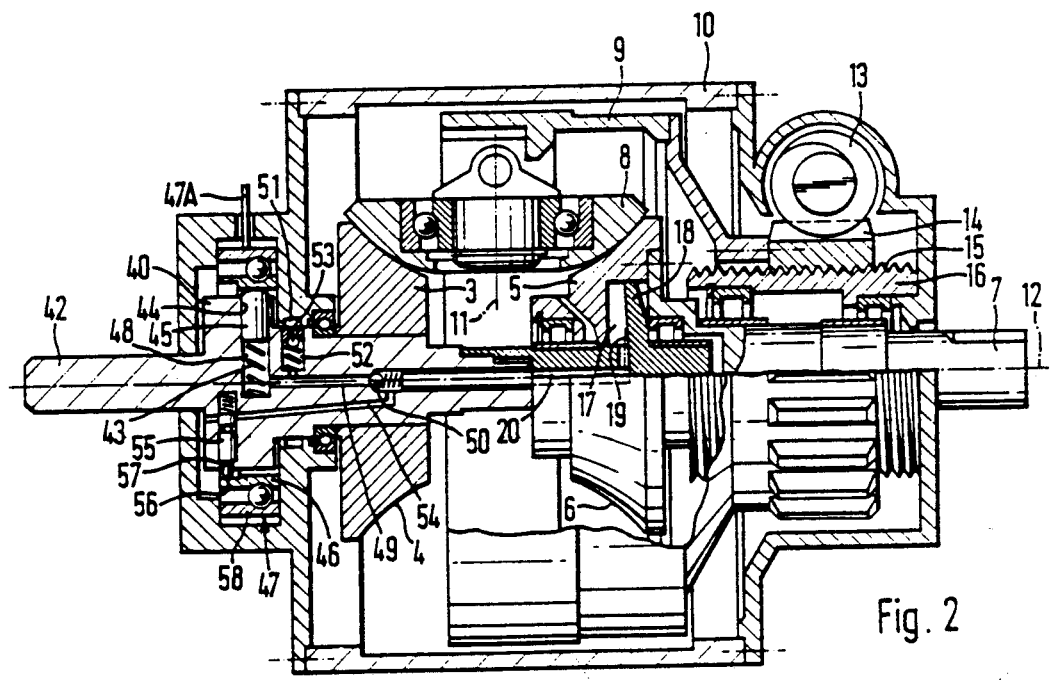
FIG. 2 is a side elevation view, partially in cross-section, of a second embodiment of the friction gear system of the present invention with a single pump piston and independently controlled relief valves.

Referring to FIG. 2, there is shown a second embodiment of the invention. Parts corresponding with those in FIG. 1 are denoted by identical reference numerals and not explained again. In this modified embodiment, provision is made for a shaft 42, instead of an input shaft 1. Shaft 1 in FIG. 1 is capable of being coupled with drive shaft 2 for rotation therewith. Both shafts 1 and 2 are replaced by shaft 42 in FIG. 2. In this second embodiment of the invention, the design of the pump and the way in which the pressure medium is fed into hollow space 17 differs from that discussed above with reference to the embodiment of FIG. 1.

In the embodiment of FIG. 2 drive shaft 42 is axially not displaceable with respect to housing 10. In this embodiment the driven part 5 which is fixed to driven shaft 7 is axially displaceable with respect to drive shaft 42 and its piston plate 18.

Instead of having a radial pump with at least two pump pistons arranged in the train of transmission, provision is made for a radial pump arranged in the shaft and having only one pump piston 45. Pump piston 45 is arranged in a cylindrical bore 44 of the pump casing 40, which is rigidly connected with shaft 42. By means of a pressure spring 43, the piston 45 is forced radially outwardly against the inner race 46 of an antifriction bearing 47. Bearing 47 is radially adjustable by means of a positioning device 47A (not shown in detail). Both the bearing 42 and its positioning device 47A form a control means for controlling the pressure delivered by said pump. When antifriction bearing 47 is in an eccentric position relative to drive shaft 42, pump piston 45 performs a pump stroke or reciprocates with each rotation of shaft 42.

A pressure duct 49 leads from the compression space 48 of the pump, which space houses pressure spring 43, to the pressure conduit 20. Pressure conduit 20 runs axially within drive shaft 42 and feeds into hollow space 17. A return valve 50 to be opened by the pressure is located at the point where pressure duct 49 feeds conduit 20.

An inlet chamber 51 for a pressure medium, the latter being fed in prior to being pressurized, is arranged in housing 10 of the gear system and is connected with pressure duct 49 by way of a suction conduit 52. Suction conduit 52 can be shut off by a return valve 53 which is opened by suction. As this system has to permit a downward pressure correction, provision is made for a relief conduit 54 leading from pressure conduit 20 to a sump or the like. Relief conduit 54 may be closed by a controlled relief valve 55. This controlled relief valve 55 may be in the form of a spring-loaded piston valve, of which the piston rod 57 projects radially from the pump casing 40 and is operatively connected to a control cam 56, the latter moves piston rod 57 in the radial direction. In this embodiment, control cam 56 is connected as one single piece with the inner race 46 of radially adjustable antifriction bearing 47, such inner race rotating with the pump piston 45.

During the operation of the gear system, pressure medium is sucked from inlet chamber 51 by means of the radial stroke of pump piston 45 and forced into the pressure conduit 20. Suitable sensors (not shown in the drawing) are used to measure the contact pressure applied to the parts of the gearing. Using this sensed pressure it is possible to control the stroke of the pump piston 45, and thus the generated pressure, by radially adjusting antifriction bearing 47. In order to reduce such pressure, the pressure medium is drained from the pressure conduit 20 into the relief conduit 54 by opening relief valve 55. Opening valve 55 is effected in relating to the corresponding position of the antifriction bearing 47 and of control cam 56.

Figure 3:
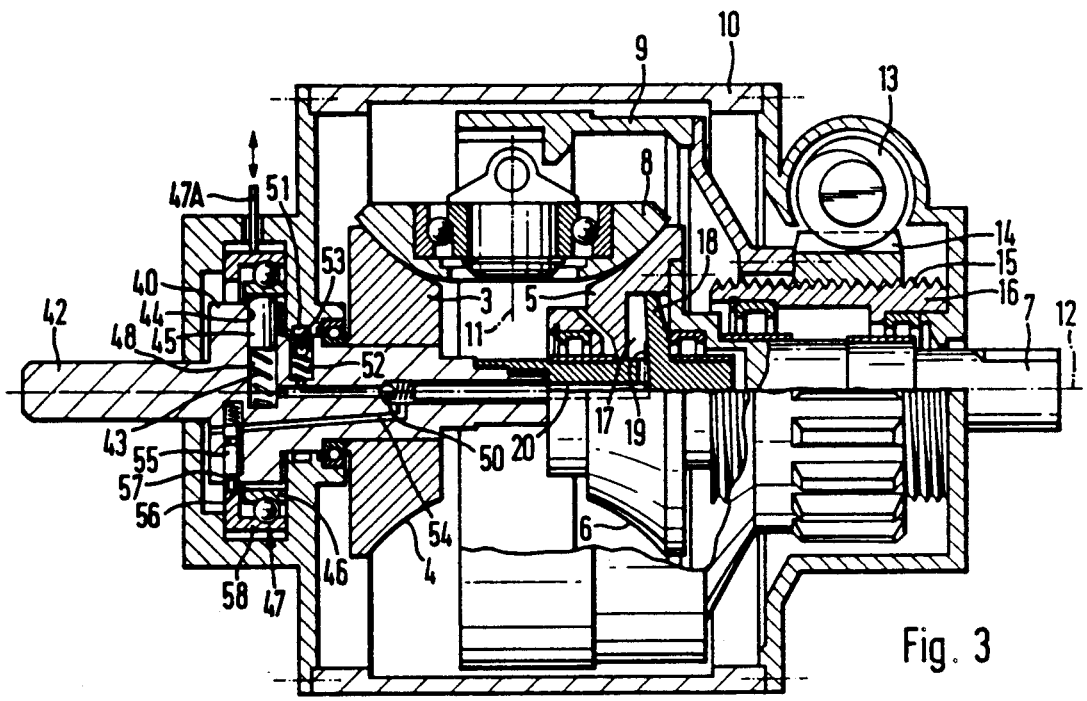
FIG. 3 is a side elevation view, partially in cross-section, of a third embodiment of the friction gear system of the present invention with a single pump piston and independently controlled relief valves.

Referring to FIG. 3, there is shown another embodiment which differs from the one shown in FIG. 2 only in that piston rod 57 of relief valve 55 is guided on a control cam 56 which is rigidly joined with the outer race 58 of radially adjustable antifriction bearing 47.

Figure 4:
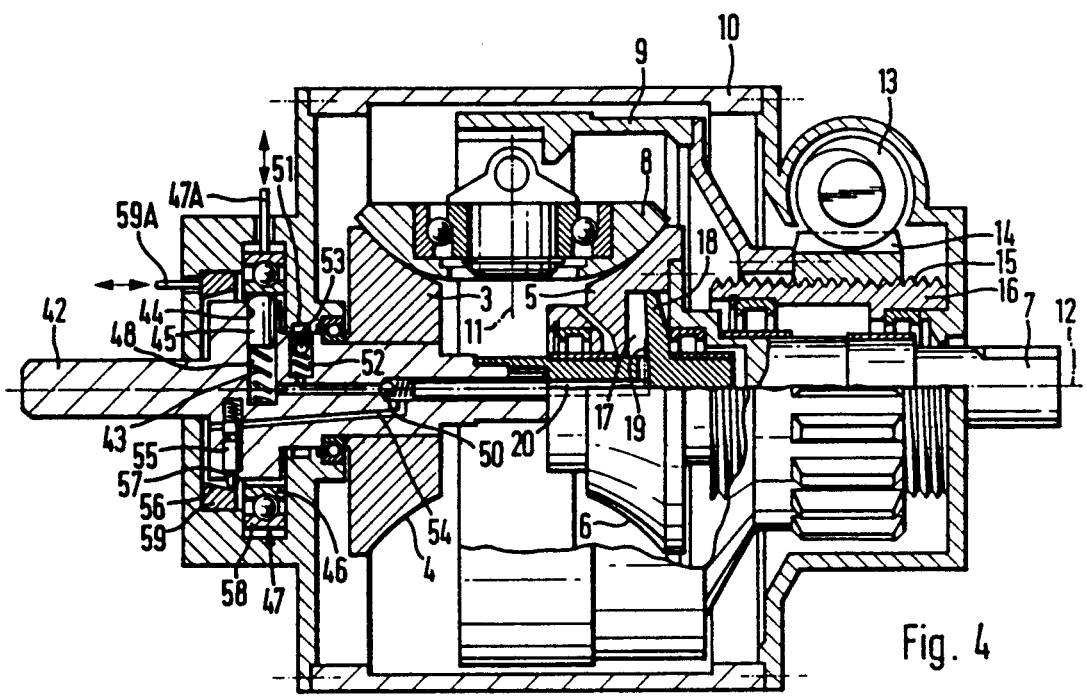
FIG. 4, a side elevation view, partially in cross-section, of a fourth embodiment of the friction gearing of the present invention with a single pump piston and independently controlled relief ; and, FIG. 5 is a fifth embodiment with a driving part acted upon by pressure.

In the embodiment shown in FIG. 4, which in other respects is identical to that of FIGS. 2 and 3, provision is made such that the control cam 56 of piston rod 57 of relief valve 55 is the inner surface of a centric ring 59, which is axially displaceable in housing 10 of the gear system and is movable by means of a positioning device 59A (not shown in detail). In lengthwise cross-section, the inner surface of central ring 59 has an approximately conical shape.

Figure 5:
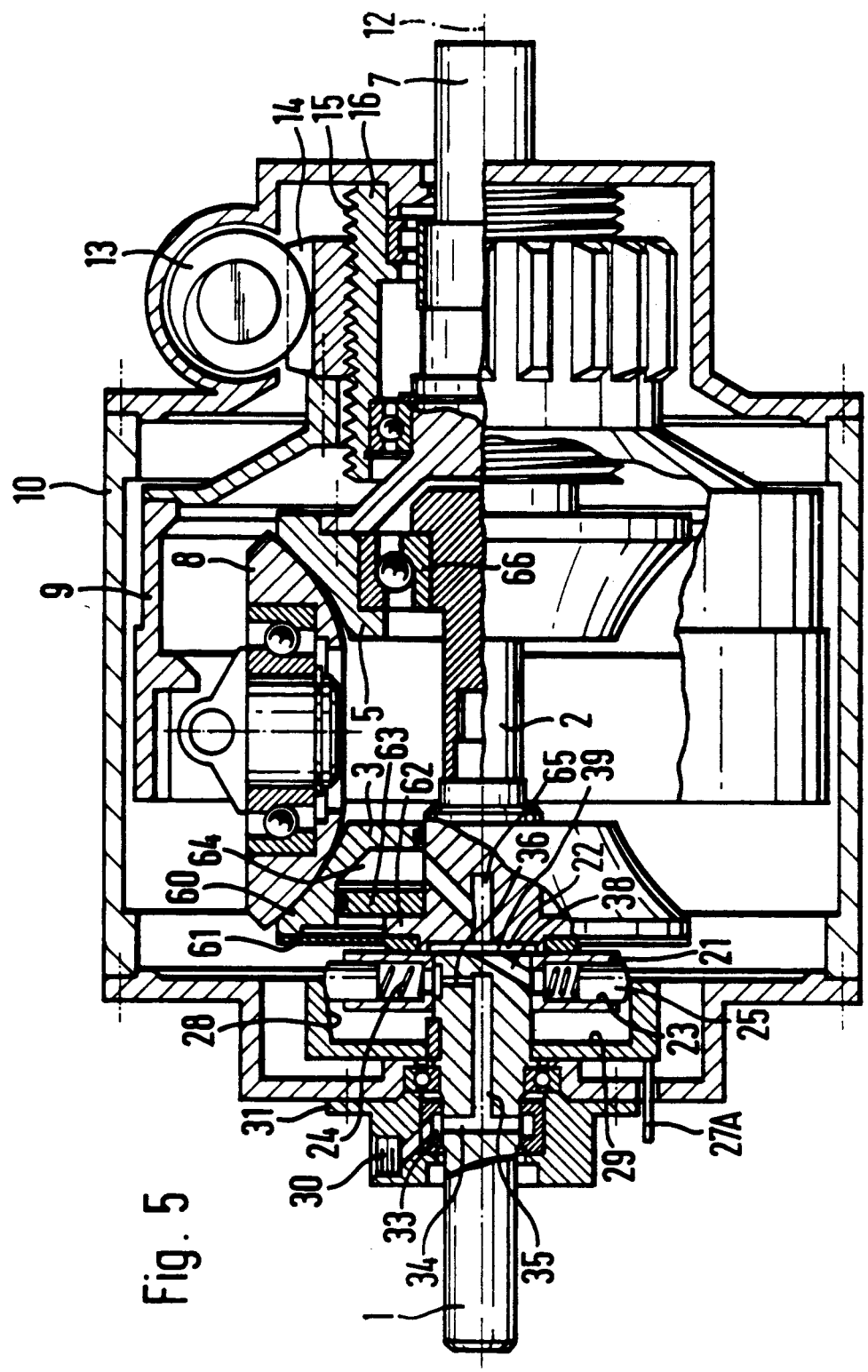

Referring to FIG. 5, there is a multi-piston pump of the type shown in FIG. 1, wherein it is also possible to axially displace drive part 3 instead of driven part 5 by applying pressure to part 3 and forcing it against the swivel disks. Clearly, this embodiment can also be used with the types of pumps shown in FIGS. 2 to 4, as well.

In the embodiment shown in FIG. 5, the pump arrangement is identical with that of FIG. 1. In this embodiment, drive part 3 is made in the form of a hollow body and consists of a bell-shaped outer surface 60 with a concave profile. Surface 60 is axially displaceable on drive shaft 2 and rotates with the latter and is closed off by a resilient thin-walled bottom 61 having spring-like elasticity. Bottom 61 is designed and arranged in a way such that it permits a short axial path of spring deflection and is supported on the back side of a collar 62 on drive shaft 2. A piston 63 is seated on drive shaft 2 at the front side of collar 62 and rotates therewith. Piston 63 defines, with bottom 61, a cylindrical hollow space 64. Pressure conduit 65 feeds this hollow space 64. In order to close the force transmission system, driven member 5 is supported and axially positioned on driving shaft 2 by means of an antifriction bearing 66. This embodiment has the advantage that a superior seal is possible due to the synchronized motion of piston 63 and shaped disk 60. However, the supporting force has to be absorbed by antifriction bearing 66.

While several of the embodiments and examples of the present invention have been illustrated and described, it is obvious that many changes and modifications may be made thereunto, without departing from the spirit and scope of the invention.

What is claimed is:

1. In a swivel disk friction gear system of the type mounted within a housing and having a drive shaft and a driven shaft, said gear system comprising:

a driving part having a concave outer surface mounted on the drive shaft;

a coaxial driven part having a concave outer surface rotatably mounted on the drive shaft and operatively coupled to the driven shaft;

a set ring mounted between the driving and driven parts moveable in the axial direction thereof;

a swivel disk having a convex outer surface pivotably mounted on said set ring for free pivoting with respect thereto and frictionally engaging said concave surface of said driving and driven parts;

a cylindrical bore in said driven part, being axially displaceable towards the driven part;

a piston plate fixed to said drive shaft and mounted within said cylindrical bore in a manner defining a closed space therebetween and for relative movement therewith upon the axial displacement of said driving part;

means for introducing pressurized fluid medium into said space within said cylindrical bore between said piston and said driven part;

a pump integral to the drive shaft and actuated by the rotation thereof for pressurizing said pressurized fluid medium, said pump producing sufficient pressure to axially move said driving part produce, via said swivel disk, a frictional engagement between said driving and driven parts;

the improvement which comprises means for controlling the pressure of said pressurized fluid medium to vary the force of said frictional engagement;

said pump comprising;

on the drive side of the gear system, oppositely to said concave outer surface of said driving part, and rigidly connected and rotating with said driving part a cylindrical pump casing having on its drive side a blind bore adapted to rotatably receive the free end of an input shaft for coupling with said drive shaft;

said pump casing having at least two radial cylindrical bores therein;

and in each of said bores a radially slidably piston supported therein on a pressure spring, said pistons having radially free outer ends projecting beyond the radially outer ends of said bores;

a hollow coupling part having a bell-like inner surface surrounding the free ends of the pump pistons, said coupling part rotating with the input shaft but being axially displaceable with respect thereto, said inner surface forming a control cam surface limiting the radial movement of said pump pistons, said cam surface having a first diameter at a closed end and then expanding toward an open end;

a radially extending suction conduit formed within said input shaft for conducting the medium to the pump prior to pressurization; and, a pressure duct formed within said input shaft and leading from said cylindrical bores to an inner end surface of the input shaft.

2. The swivel disk friction gear system, as defined in claim 1, wherein one of said driving or driven parts has a hollow body with a thin resilient elastic bottom supported on one of said respective drive or driven shaft.

3. In a swivel disk friction gear system of the type mounted within a housing and having a drive shaft and a driven shaft, said gear system comprising;

a driving part having a concave outer surface mounted on the drive shaft;

a coaxial driven part having a concave outer surface rotatably mounted on the drive shaft and operatively coupled to the driven shaft;

a set ring mounted between the driving and driven parts moveable int he axial direction thereof;

a swivel disk having a convex outer surface pivotably mounted on said set ring for free pivoting with respect thereto and frictionally engaging said concave surface of said driving and driven parts;

a cylindrical bore in said driven part, the driven part being axially displaceable towards the driving part;

a piston plate fixed to said drive shaft and mounted within said cylindrical bore in a manner defining a closed space therebetween and for relative movement therewith upon the axial displacement of said driven part;

means for introducing pressurized fluid medium into said space within said cylindrical bore between said piston and said driven part;

a pump integral to the drive shaft and actuated by the rotation thereof for pressurizing said pressurized fluid medium, said pump producing sufficient pressure to axially move said driven part with respect to said piston plate to produce, via said swivel disk, a frictional engagement between said driving and driven parts;

the improvement which comprises means for controlling the pressure of said pressurized fluid medium to vary the force of said frictional engagement;

on the drive side of the gear system, oppositely to said concave outer surface of said driving part, and rigidly connected and rotating with said driving part a cylindrical pump casing having on its drive side a blind bore;

said pump casing having at least two radial cylindrical bores therein;

and in each of said radial bores a radially slidable pump piston supported therein on a pressure spring, said pump pistons having radially free outer ends projecting beyond the radially outer ends of said radial bores;

a radially adjustable roller bearing mounted between the pump casing and the housing of the gear system, said roller bearing having an inner surface slidably engaging said outer end of said pump piston, said inner surface formed from an inner race of said bearing;

a suction conduit connected to a space formed between said radial cylindrical bore receiving the pressure spring of the pump piston by way of a first return valve opening under suction and connected on a pressure side with a pressure conduit for conducting the pressure medium to said driven part by way of a second return valve opening under pressure; and, a relief conduit leading from the pressure conduit to a sump and a relief valve with a spring-loaded closing member for blocking said relief conduit, said relief conduit is arranged in said casing downstream of said second return valve, a piston rod of said relief valve radially projecting from the casing operatively connected to a control cam controlling the radial movement of said piston rod.

4. The swivel disk friction gear system, as defined in claim 3, wherein the control cam for the relief valve is rigidly connected with an outer race of said roller bearing.

5. The swivel disk friction gear system, as defined in claim 3, wherein the control cam for the relief valve is rigidly connected with the inner race of the roller bearing.

6. The swivel disk friction gear system, as defined in claim 3, wherein the control cam for the relief valve is a ring axially displaceable in the housing of the gear system, an inner surface of said ring having a partly conical shape centered about the axes of rotation of said drive shaft.

* * * * *